United States Patent [19]

Nakamura et al.

[11] Patent Number: 5,674,548
[45] Date of Patent: Oct. 7, 1997

[54] DEFATTED SOYBEAN MILK, SOYBEAN PROTEIN AND SOYBEAN PROTEIN MATERIAL AND PROCESS FOR PREPARING THEM

[75] Inventors: Yasushi Nakamura; Motohiko Hirotsuka; Yasuo Otani, all of Osaka-fu, Japan

[73] Assignee: Fuji Oil Company, Ltd., Osaka, Japan

[21] Appl. No.: 584,178

[22] Filed: Jan. 11, 1996

[30] Foreign Application Priority Data

Jan. 12, 1995 [JP] Japan .................... 7-003369
Sep. 29, 1995 [JP] Japan .................... 7-254018

[51] Int. Cl.$^6$ .................... A23L 1/05; A23L 1/0562
[52] U.S. Cl. .................... 426/598; 426/481; 426/573; 426/629; 426/634
[58] Field of Search .................... 426/481, 598, 426/629, 634, 573

[56] References Cited

U.S. PATENT DOCUMENTS 2,495,706  10/1950  DeVoss et al. .................... 426/430
4,435,438  3/1984  Lehnhardt et al. .................... 426/430

*Primary Examiner*—Helen Pratt
*Attorney, Agent, or Firm*—Wenderoth, Lind & Ponack

[57] ABSTRACT

There is disclosed a process for producing a soybean protein material and a soybean protein by extracting defatted soybean milk from a defatted soybean raw material in an aqueous system by preventing association of soybean proteins, separating the defatted soybean milk from the system to obtain an extraction residue as the soybean protein material, and isolating a soybean protein from the defatted soybean milk, said defatted soybean milk being kept at 40° C. or lower until isolation of said soybean protein. The isolated soybean protein having properties that can form a transparent solution and gel which cannot be obtained by a conventional isolated soybean protein is disclosed. The soybean protein material has excellent water retention and oil retention together with minimized mouthfeel change due to freeze-thaw treatment.

4 Claims, 2 Drawing Sheets

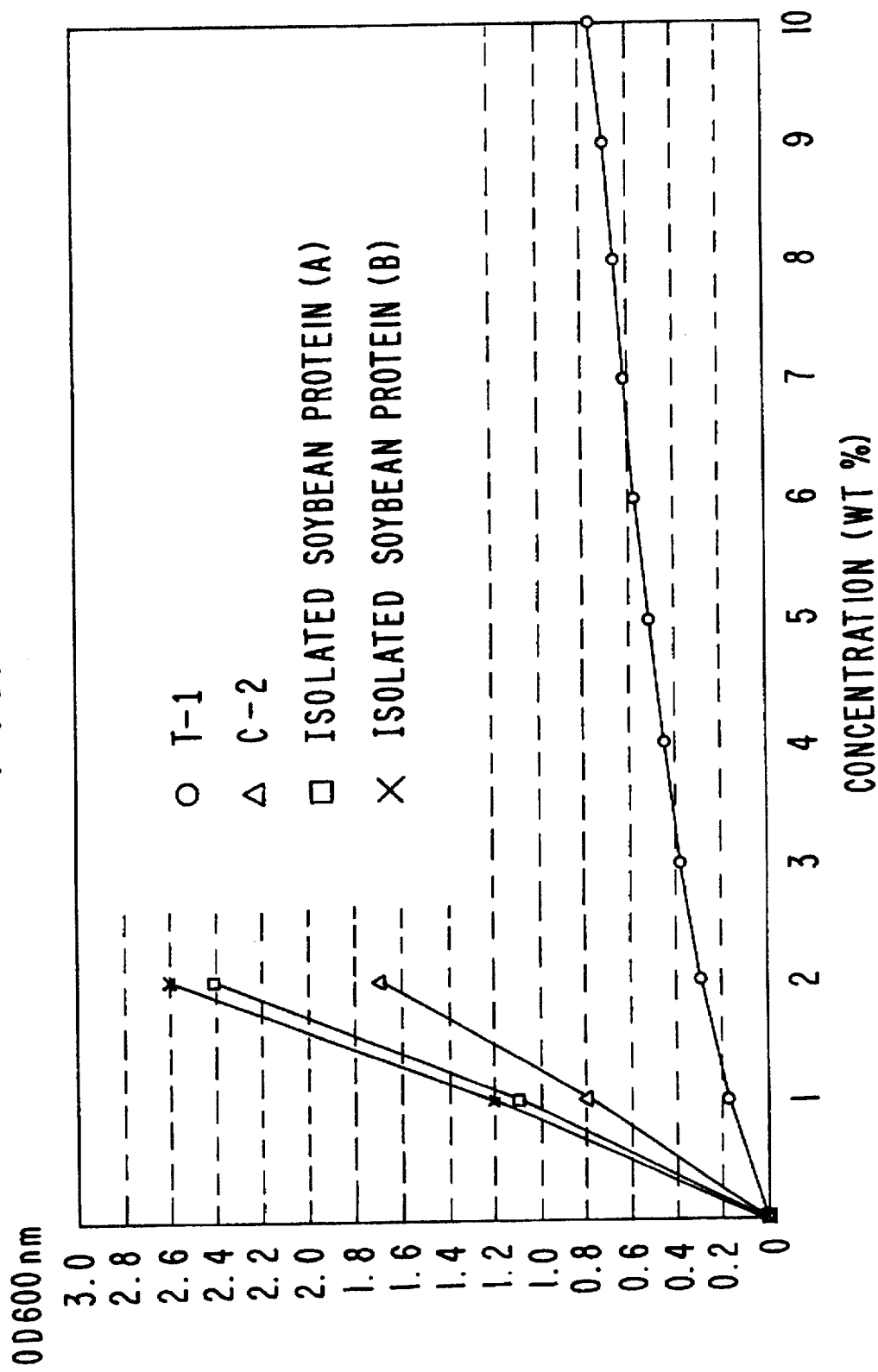

DEFATTED SOYBEAN MILK, SOYBEAN PROTEIN AND SOYBEAN PROTEIN MATERIAL AND PROCESS FOR PREPARING THEM

FIELD OF THE INVENTION

The present invention relates to soybean milk having high transparency and a soybean protein material having an excellent oil retention with minimized mouthfeel change due to freeze-thaw treatment. The present invention also relates to a soybean protein which provides a transparent solution and forms a transparent and strong gel.

BACKGROUND OF THE INVENTION

In general, an isolated soybean protein is produced by extracting defatted soybean milk from a defatted soybean protein raw material, for example, with stirring the raw material in an aqueous system to remove insoluble components such as "okara" (extraction residue or debris of soybean) and to obtain a water soluble fraction, isoelectrically precipitating the water soluble fraction at PH 4 to 5, normally, pH 4.2 to 4.6 to remove water soluble components such as whey and to obtain a precipitate fraction and then separating, neutralizing and drying the precipitate fraction.

When the isolated soybean protein thus produced is dissolved or dispersed in water, it provides an opaque solution or dispersion. When such a solution or dispersion containing the protein in a certain concentration or higher is heated, an opaque gel (white and cloudy) is formed and any transparent gel such as that made from gelatin cannot be obtained. It is considered that this would be caused by acceleration of association of protein components during production steps such as extraction and isoelectric precipitation to form an isolated soybean protein mainly composed of random aggregates.

In particular, it is considered that 11S protein of soybean is readily associated to form aggregates as a complex including 7S protein. Therefore, the production of transparent solution and gel by using an isolated soybean protein produced by a conventional process is difficult.

As for a method for producing transparent solution and gel, in view of low association reactivity of 7S protein, the production of an isolated soybean protein having a increased purity of 7S fraction of soybean protein has been proposed. However, this method has not been industrially practiced because the operations are complicated and reagents to be used are unsuitable for foods.

In addition, there is a method wherein an opaque isolated soybean protein, a complex or polymer of 11S and 7S fractions is artificially dissociated by addition of a reducing agent such as sodium hydrogen sulfite or mercaptoethanol, a protein solubilizing agent such as sodium dodecyl sulfate or urea and an alkaline agent to increase transparency. However, for obtaining the desired effect, the concentration of these agents must be high and this is unsuitable for foods. Therefore, this method is also unsuitable for producing an isolated soybean protein for foods.

Furthermore, as physical treatments, there are dissociation of protein components by ultrasonic treatment and gel formation by ultra high pressure treatment. However, in the former treatment, sufficient transparency cannot be obtained because of re-association with the elapse of time after the treatment. In the latter treatment, a transparent gel cannot be obtained, either. In addition, it is possible to produce an isolated soybean protein from only protein components existing in a molecular level obtained by removing protein components in an association state from defatted soybean milk by ultracentrifugation. However, at present, this is also difficult to be carried out in an industrial scale.

JP-A 57-29251 and JP-A 58-152895 disclose a method for producing a transparent gel by preparing an aqueous solution containing a high concentration of an isolated soybean protein or 11S protein and heating it at 70° to 130° C. for about 30 minutes. However, in these methods, transparency of the product is yet insufficient and a fractionation step is required. In addition, the product is in the form of only a gelled material and its use is limited.

OBJECTS OF THE INVENTION

One object of the present invention is to provide a soybean protein which can form a solution having transparency higher than that attained by a conventional soybean protein and can form a transparent and strong gel.

Another object of the present invention is to provide defatted soybean milk which can be used as a raw material for the production of the above soybean protein of the present invention.

Another object of the present invention is to provide a soybean protein material which has an excellent oil retention.

Still another object of the present invention is to provide a method for the production of these soybean protein, soybean milk and soybean protein material which is not required complicated operations such as fractionation 7S and 11S in a conventional method.

These objects as well as other objects and advantages of the present invention will become apparent to those skilled in the art from the following description with reference to the accompanying drawings.

BRIEF DESCRIPTION OF DRAWINGS

FIG. 2 is a graph illustrating the relationship between a concentration of each of solutions of various soybean proteins and transparency (OD at 600 nm).

SUMMARY OF THE INVENTION

Figure 1:
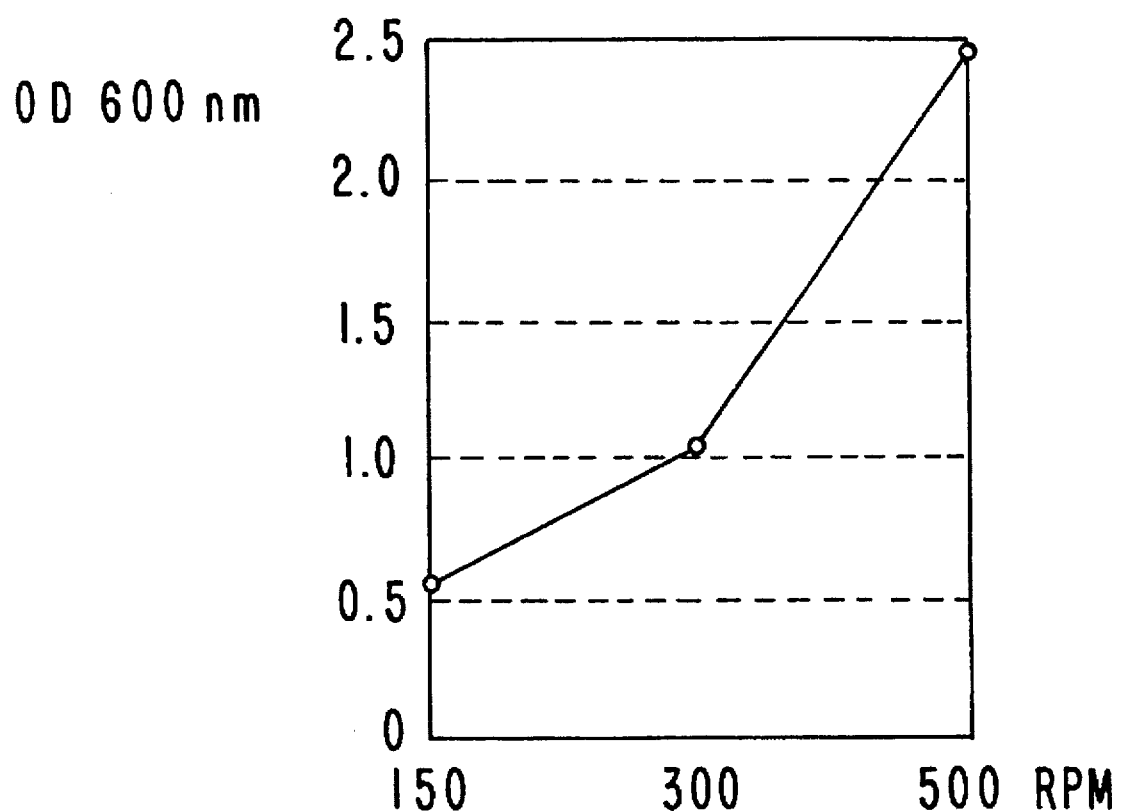
FIG. 1 is a graph illustrating the relationship between a rotation rate of a propeller and transparency (OD at 600 nm) of a 10% solution of a soybean protein obtained by extraction with stirring.

The present inventors have considered that, if a soybean milk can be produced under such conditions that aggregation and association of protein components in the defatted soybean milk (hereinafter simply referred to as soybean milk) is controlled, an ability to form transparent solution and gel can be imparted to an isolated soybean protein obtained therefrom. Then, the present inventors have intensively studied association states of protein components in various soybean milk prepared with varying extraction conditions and centrifugal forces without addition of any reducing agent and protein solubilizing agent from the viewpoint of their permeabilities through membrane filters.

As a result, the present inventors have found that, when 85% or more of the protein components of soybean milk cannot permeate through a membrane filter having a pore size of 0.22 micron, any solution and gel of an isolated soybean protein prepared from such soybean milk are opaque and OD (optical density) at 600 nm of such soybean milk (protein concentration: 2% by weight) is 1.2 or more.

The present inventors have also found that solution and gel having higher transparency can be obtained, when 65% or more of the protein components of soybean protein prepared from such soybean milk permeates a membrane having a pore size of 0.22 micron. In addition, the present inventors have found that the residue resulted from separation of such soybean milk from defatted soybean has a high protein content and an excellent oil retention and therefore it is useful as a soybean protein material.

That is, according to the present invention, there is provided a process for producing a soybean protein material and a soybean protein which comprises the steps of extracting defatted soybean milk from a defatted soybean raw material in an aqueous system with preventing association of soybean proteins, separating the defatted soybean milk from the system to obtain an extraction residue as the soybean protein material, and isolating a soybean protein from the defatted soybean milk, said defatted soybean milk being kept at 40° C. or lower until isolation of said soybean protein. For extracting defatted soybean milk with preventing association of soybean proteins, the extraction can be carried out, for example, by standing the system or stirring the system at a rate of 650 r.p.m. or lower. A measure of this is to carry out the extraction of the defatted soybean milk with maintaining soybean protein molecules in such a state that about 85% or more of soybean proteins in the defatted soybean milk can permeate through a membrane filter having a pore size of 0.22 micron.

In addition, the present invention provides a defatted soybean milk comprising soybean proteins 85% or more of which can permeate through a membrane filter having a pore size of 0.22 micron, and OD at 600 nm of an aqueous solution of said defatted soybean milk containing 2.2% by weight of soybean proteins being 1.2 or less.

Furthermore, the present invention provides a soybean protein material which comprises 40 to 65% by weight of soybean proteins, 20 to 50% by weight of soybean fiber and 5% by weight or less of soybean soluble saccharides based on the dry solids content of the soybean protein material, said material having NSSI (nitrogen salt solubility index) of 20 or more.

The present invention further provides a soybean protein having a permeability of said soybean protein in its aqueous solution or dispersion state through a membrane filter having a pore size of 0.22 micron being 65% or more, OD at 600 nm of an aqueous solution of 10% by weight of said soybean protein being 2 or less and a viscosity of an aqueous solution containing 10% by weight of said soybean protein being 400 cps or less.

DETAILED DESCRIPTION OF THE INVENTION

As the defatted soybean raw material to be used in the present invention, normally, a defatted soybean derived from the production of soybean oil from soybean, for example, by pressing or by extraction with organic solvents can be used.

In the present invention, it is of importance that the defatted soybean milk is extracted from the defatted soybean raw material (hereinafter merely referred to as defatted soybean) in an aqueous system under conditions that association of soybean proteins is prevented.

Normally, the aqueous system is prepared in an aqueous slurry of the defatted soybean containing 5 to 15% by weight, preferably, 7 to 12% by weight of the defatted soybean.

The extraction is carried out with maintaining soybean protein molecules in such a state that 85% or more of soybean proteins in the defatted soybean milk can permeate through a membrane filter having a pore size of 0.22 micron.

For preventing the association of soybean proteins in the soybean milk, the extraction can be carried out, for example, by standing the system or stirring the system gently (e.g., extraction with stirring by a low rotation rate propeller), or by membrane extraction.

The extraction by standing is a method wherein the defatted soybean in an aqueous system is allowed to stand without stirring to spontaneously extract soybean milk and the soybean milk is recovered. The extraction with gentle stirring is preferably carried out with a propeller rotating such a low rate that association of soybean proteins can be prevented. The rotation rate can be varied according to a degree of denaturation of the defatted soybean and a particular shape or size of the propeller. However, for example, when 1 liter of an aqueous 10% slurry of the defatted soybean is placed in a cylindrical bath of 14 cm diameter and stirred with a propeller having four blades each having 10 cm diameter, the suitable rotation rate is 650 r.p.m. or lower in the case that NSI (nitrogen solubility index) of the defatted soybean is about 70, and the suitable rotation rate is 350 r.p.m. or lower in the case that the NSI of the defatted soybean is about 90. When the rotation rate is high, soybean proteins tend to associate and the resulting soybean milk tends to become opaque. Then, even a transparent soybean milk is obtained, the soybean protein isolated therefrom in the later step will become opaque. That is, since the tendency of association of extracted soybean proteins increases as increase in NSI of the defatted soybean, a rotation rate of the propeller is preferably lower than the above.

In addition, extraction conditions such as the rotation rate of stirring and stirring time can be controlled according to particular NSI, size of flakes of the defatted soybean, amount of the defatted soybean to be used and shape or size of the propeller. As described above, the measure of this is such that about 85% or more of soybean proteins in the defatted soybean milk can permeate through a membrane filter having a pore size of 0.22 micron.

The membrane extraction can be carried out using UF (ultrafiltration) membrane or the like to fractionate soybean milk from an aqueous slurry of the defatted soybean.

According to the present invention, the soybean protein material is obtained by separating and removing an extraction residue (a soybean protein material containing "okara" component and non-extracted proteins) from a soybean milk slurry prepared by mixing and stirring the defatted soybean with water.

The soybean milk thus obtained has a higher transparency. That is, 85% or more of the soybean protein in the soybean milk can permeate through a membrane filter having a pore size of 0.22 micron and OD at 600 nm of an aqueous solution containing 2.2% by weight of the soybean protein is 1.2 or less. Normally, the concentration of the soybean protein in the soybean milk is 2% by weight or higher, preferably 2 to 6 by weight. Even when the soybean milk is spray-dried to obtain a soybean powder, a reconstructed soybean milk prepared by dissolving the soybean powder in water is transparent.

These soybean milk and soybean milk powder are suitable for raw materials for the production of drinks and the like.

The soybean protein material obtained by separating the soybean milk from the extraction system of the present invention has NSSI of 20 or more and contains 40 to 65% by weight of soybean proteins, 20 to 50% by weight of soybean fiber and at most 5% by weight of soluble soybean saccharides based on the dry solids content.

The soybean protein material of the present invention is characterized in that NSSI is higher than that of a mixture of "okara" and a conventional isolated soybean protein which is adjusted to the same protein content as that of the soybean protein material of the present invention. Specifically, NSSI of the mixture is about 15, while that of the soybean protein material of the present invention is 20 or more, preferably 20 to 80, more preferably 30 to 70. Upon addition of water to the soybean protein material of the present invention to form an aqueous slurry, the material has less gel-like mouthfeel and smooth feeling to the throat.

NSSI used herein is a ratio of proteins dissolved in 2.5% sodium chloride solution as measured in Examples hereinafter.

Since the protein content of the soybean protein material of the present invention is 40 to 65% by weight and the soluble soybean saccharides thereof are 5% or less, the protein content of the soybean protein material of the present invention is higher than that of "okara", but lower than that of a conventional concentrated protein or isolated soybean protein. Its soybean soluble saccharides are adjusted to the same level as that of a conventional isolated soybean protein or concentrated protein.

As described hereinafter, soybean protein components of the soybean protein material are different from those contained in "okara" or a conventional concentrated protein. In general, when a soybean protein content is higher, gel forming ability becomes higher, which results in improvement of water retention and oil retention (emulsifying ability). However, since mainly concerned components are proteins, they are liable to be influenced, for example, by acidic conditions and freezing to cause insolubilization and frozen denaturation of proteins, which results in deterioration of water retention and oil retention (emulsifying ability) accompanying remarkable change in mouthfeel. Then, such a material is unsuitable for using as a raw material for foods. On the other hand, when a soybean protein content is lower, a soybean protein material has "okara"-like mouthfeel, i.e. rough or coarse to the throat. In addition, since such a soybean protein material has inferior adhesion or integrity, it has disadvantages that miscibility or integrity of a mixture of raw materials becomes inferior upon mixing it with other edible materials. Furthermore, even if "okara" is pulverized to improve its mouthfeel, the unpleasant feeling to the throat is not improved and rather becomes worse, though the rough feeling is disappeared. Then, in the present invention, the soybean protein content in the soybean protein material is adjusted to 40 to 65% by weight, preferably 45 to 55% by weight based on the dry solids content so that the soybean protein material can maintain excellent water retention and oil retention with minimizing deterioration of physical properties and change in mouthfeel even under acidic conditions or frozen conditions.

In addition, deterioration of water retention and oil retention of the soybean protein material of the present invention due to ethanol denaturation can be minimized because, in comparison with a conventional concentrated protein, protein denaturation is scarcely caused during the production steps of the soybean protein material of the present invention. Moreover, the production of an unpleasant taste component, ASF (Acid Sensitive Fraction), by acid denaturation hardly occurs and therefore the material has a pleasant taste. Furthermore, change of physical properties due to a low protein content under acidic or frozen conditions can also be minimized.

Likewise, physical properties of the soybean protein material of the present invention are very stable in comparison with a conventional isolated soybean protein because the soybean protein material is composed of not only proteins but also other components and severe protein denaturation under acidic or frozen conditions can be avoided.

Then, the soybean protein of the present invention can be isolated from the soybean milk.

To isolate the soybean protein, for example, an industrially applicable isolation method such as isoelectric precipitation method or isolation by UF membrane can be used. There is no need to employ a special and complicated method such as specific fractionation and extraction of 7S protein and 11S protein.

For example, in the case of isoelectric precipitation, an aqueous transparent solution of the soybean protein can be obtained by adding an acid to the soybean milk to adjust the pH to about the isoelectric point of the soybean protein, recovering the precipitated soybean protein and, if necessary, neutralizing it.

The soybean protein solution can be dried, if necessary, after sterilization pasteurization or sterilization of the solution to obtain the desired soybean protein. Even if heat sterilization (e.g., HTST (high temperature short time) heat sterilization) is carried out or heat is applied to the drying step, transparency of the soybean protein obtained is not lost. That is, both aqueous solution of the soybean protein and gel prepared therefrom have transparency.

In the production of the soybean protein of the present invention, another important point is to maintain the temperature of the soybean milk from which the soybean protein is isolated at 40° C. or lower. Specifically, the extraction step of the soybean milk is carried out at 40° C. or lower and the soybean milk is maintained at 40° C. or lower until it is subjected to the isolation of the soybean protein.

However, in the case of the production of only the soybean milk, there is no need to maintain the soybean milk at 40° C. or lower. Good transparency of the soybean milk can be maintained even by carrying out the extraction thereof from the defatted soybean at 50° C., or by extracting and maintaining the soybean milk obtained at 50° C., or by heating the soybean milk obtained at 40° C. or lower to 50° C.

To the contrary, as described above, in the case of the production of the soybean protein, if the soybean protein is extracted from the soybean milk which has been once heated above 40° C., the resulting soybean protein loses transparency.

An apparent molecular weight of a commercially available soybean protein obtained from soybean milk is as large as about millions because of association of soybean proteins (normally, permeability of the protein through a membrane having a pore size of 0.22 micron is about 30 to 45%) and aqueous solution and gel thereof are opaque. To the contrary, 80% or more of the soybean protein obtained from soybean milk of the present invention has a molecular weight of 50,000 or less and, in an aqueous solution or dispersion state, 65% or more of the protein can permeate through a membrane having a pore size of 0.22 micron. In addition, OD at 600 nm of an aqueous solution containing 10% by weight of the protein is 2 or less and the viscosity of the 10% aqueous solution is 400 cps or less.

Since any particular fractionation of only 7S or 11S component is not included in the production of the soybean protein of the present invention, the soybean protein contains 7S and 11S components in a balanced ratio. The 7S/11S ratio of the soybean protein of the present invention is within the range of 0.3 to 3, preferably 0.5 to 2.5 and, normally, it can be within the range of 0.5 to 2.

Furthermore, since any fractionation at a specific salt concentration is not included in the production of the soybean protein of the present invention, electrophoresis (SDS-PAGE) does not show any lost band (e.g., at 34 kd).

The following examples, comparative examples, experiments and application examples further illustrate the present invention in detail but are not to be construed to limit the scope thereof. Hereinafter, all the "parts" and "percents" are by weight unless otherwise stated.

EXAMPLE 1

Ten parts of cold water at 15° C. was added to 1 part of defatted soybean flakes (NSI 90) (manufactured by Fuji Oil Co., Ltd.) and extraction was carried out at pH 6.7 for 15 minutes with stirring by a propeller stirrer at 150 rpm (four blades each having 10 cm diameter) (manufactured by Tokyo Rikagaku Co., Ltd.) to obtain a slurry. The slurry was centrifuged at 1,300 G for 10 minutes by a centrifuge (manufactured by Kokusan Enshinki Co., Ltd.) to remove an insoluble fraction ("okara" component) and to obtain a soybean milk.

This insoluble component was pulverized by a wet pulverizer "Super Mass Colloider" (manufactured by Zoko Sangyo Co., Ltd.), neutralized, subjected to HTST sterilization (at 140° C. for 7 seconds) and then spray-dried to obtain 0.50 part of a powdery soybean protein material.

The soybean protein material had the average particle size of 40.2 microns, the maximum particle diameter of 130 microns, the protein content of 55%, the soybean fiber content of 31%, the soybean soluble saccharide content of 4%, and moisture content of 5.5%.

In addition, the soybean milk was isoelectrically precipitated by adjusting pH thereof to 4.5 at 20° C. and the precipitate fraction was separated to recover the protein component.

After neutralizing, the protein component recovered was subjected to HTST sterilization (at 140° C. for 7 seconds) and spray-dried to obtain 0.260 part of a powdery isolated soybean protein (T-1).

EXAMPLE 2

According to the same manner as described in Example 1, an isolated soybean protein (T-2) (0.240 part) was obtained except that a defatted soybean (NSI 80) was used instead of the defatted soybean flakes (NSI 90).

Experiment 1

Transparency of solution

One hundred and eighty ml of water was added to each of the isolated soybean proteins T-1 (20 g) and T-2 (20 g) obtained in Examples 1 and 2 and each protein was completely dissolved with a homomixer at 3,000 r.p.m. Then, each solution was deaerated by a centrifuge (manufactured by Kokusan Enshinki Co., Ltd.), and OD at 600 nm was measured by a spectrophotometer (manufactured by Shimadzu Corporation). The OD at 600 nm of T-1 solution was 0.75 and that of T-2 solution was 0.62. Both solutions had excellent transparency.

According to this result, it has been found that the defatted soybean having lower NSI can give an isolated soybean protein having better transparency.

However, in this case, the solution of T-2 obtained from the defatted soybean having lower NSI was yellowish, while the solution of T-1 obtained from the defatted soybean having higher NSI was almost colorless.

Preparation of gel

Twenty hundred and twenty five ml of 2% sodium chloride solution was added to each of the isolated soybean proteins T-1 (50 g) and T-2 (50 g) obtained in Examples 1 and 2 and each mixture was treated by a food processor (manufactured by Matsushita Electric Industrial Co., Ltd.) for 5 minutes to prepare a paste containing salt and 4.5 times of water. Then, the paste was deaerated with a vacuum sealer and it was filled into a casing tube having a lay flat width of 35 mm. The both open ends of the tube was ligated by clips. Then the filled casing tube was heated in a water bath at 80° C. and cooled in a stream of cold water for 30 minutes to obtain a casing gel.

Measurement of gel break strength

Each of the above casing gels was cut into round slices of 20 mm thickness and the slices were used as samples. Each sample was subjected to gel break strength measurement by using a rheometer (manufactured by Yamaden Co., Ltd.) with a cylindrical plunger of 8 mm diameter. The measurement was carried out under the following conditions:

| Load cell | 2 kg |
| --- | --- |
| Storage pitch | 0.1 sec |
| Measuring rate | 1.0 mm/sec |
| Contact diameter | 8.0 mm |
| Magnification | 1 |
| Measuring strain | 80% |

The break strength of each gel was as follows:

| T-1 casing gel | 740 g |
| --- | --- |
| T-2 casing gel | 820 g |

A stronger gel was formed by T-2 obtained from the defatted soybean having the lower NSI.

Transparency of gel

One hundred and eighty ml of water was added to each of the isolated soybean proteins T-1 (20 g) and T-2 (20 g) obtained in Examples 1 and 2 and the protein was completely dissolved by a homomixer at 3,000 r.p.m. After deaeration with a centrifuge, each solution was poured into a quartz cell (inner diameter 10 mm×10 mm×45 mm) and sealed with parafilm. After confirmation of no bubble in the cell, the solution was heated in a water bath at 80° C. for 30 minutes to obtain a heated gel.

The gel thus obtained in the cell as such was subjected to a spectrophotometer and OD at 600 nm was measured. OD of T-1 was 0.70 and OD of T-2 was 0.56. Thus, a gel having excellent transparency was obtained.

Colloidal state in aqueous solution

Each of the isolated soybean proteins T-1 (0.5 g) and T-2 (0.5 g) obtained in Examples 1 and 2 was dissolved in deionized water to prepare a 0.5% aqueous solution. Then, 0.1 ml of the solution was applied to a membrane filter having a pore size of 0.22 micron ("Ultrafree C3" manufactured by Millipore Co.) and centrifuged by a centrifuge until the liquid completely permeated through the membrane.

The filtrate was analyzed by Lowry method to calculate permeability of the protein component in the solution. The permeability of the protein component of T-1 was 88% and that of T-2 was 80%.

Soybean milks of Examples 1 and 2

OD at 600 nm of each of the soybean milks obtained in Examples 1 and 2 was measured. The OD at 600 nm of a aqueous solution containing 2.2% of the protein (T-1) was 0.65 and that of the protein (T-2) was 0.41.

The permeated fraction of T-1 through a membrane filter having pore size of 0.22 micron contained 95% of the protein component and that of T-2 contained 98% of the protein component.

Comparative Example 1

Temperature of treatment of soybean milk

The soybean milk obtained according to the same manner as Example 1 (degree of saccharose: 6.2 Brix, protein concentration: 2.2%, OD at 600 nm: 0.65, permeability of the protein through a membrane having a pore size of 0.22 micron: 95%) was placed in a bath at 50° C. and, when the temperature was elevated to 50° C., the pH was adjusted to 4.5 with addition of hydrochloric acid to cause isoelectrical precipitation. The precipitate fraction was separated and the protein fraction was recovered. The recovered protein was neutralized, subjected to HTST sterilization and spray-dried to obtain 0.260 part of a powdery isolated soybean protein (C-1).

The powdery isolated soybean protein thus obtained was dissolved in water to obtain a 10% aqueous solution. This solution was clouded and therefore its OD at 600 nm could not be measured. The protein permeability of its 0.5% aqueous solution through a membrane having a pore size of 0.22 micron was 45%.

Comparative Example 2

Extraction temperature of soybean milk

According to the same manner as Example 1, a soybean protein was produced except that the defatted soybean was extracted with warm water at 50° C.

The soybean milk thus obtained had a degree of saccharose: 6.8 Brix, the protein concentration of 2.7%, OD at 600 nm of 0.40 and the protein permeability through a membrane having a pore size of 0.22 micron of 88% and was transparent.

The soybean milk was placed in a bath, cooled to 20° C. and then adjusted to pH 4.5 to cause isoelectrical precipitation. The precipitate fraction was separated to recover the protein fraction. The recovered protein was neutralized, subjected to heat treatment and spray-dried to obtain 0.300 part of a powdery isolated soybean protein (C-2). When the powdery isolated soybean protein obtained was dissolved in water to prepare a 10% aqueous solution, it was opaque and therefore the OD at 600 nm could not be measured. The protein permeability of its 0.5% aqueous solution through a membrane having a pore size of 0.22 micron was 43%.

The above results are summarized in Table 1.

TABLE 1

| Isolated soybean protein | T-1 | T-2 | C-1 | C-2 |
|---|---|---|---|---|
| NSI | 90 | 80 | 90 | 90 |
| Extraction temperature (°C.) | 15 | 15 | 15 | 50 |
| Brix of Soybean milk | 6.2 | 5.9 | 6.2 | 6.8 |
| Protein concentration % | 2.2 | 2.0 | 2.2 | 2.7 |
| OD at 600 nm of Soybean milk | 0.65 | 0.41 | 0.65 | 0.40 |
| Protein permeability (%) of soybean milk | 95 | 98 | 95 | 88 |
| Protein permeability (%) isolated soybean protein | 88 | 80 | 45 | 43 |
| Temperature (°C.) of acid precipitation | 20 | 20 | 50 | 20 |

TABLE 1-continued

| Isolated soybean protein | T-1 | T-2 | C-1 | C-2 |
|---|---|---|---|---|
| OD at 600 nm of 10% solution | 0.75 | 0.62 | nd* | nd |
| Gel break strength (g) | 740 | 820 | 480 | 640 |
| Transparency of casing gel** | o | o | x | x |

*nd: cannot be determined
**o : good transparency x: cloudy

EXAMPLE 3

Defatted soybean of NSI 70, rotation rate 600 r.p.m.

One hundred parts of a defatted soybean having a low NSI (NSI:70) and 1000 parts of cold water at 15° C. were placed in a cylindrical bath having 14 cm diameter. A propeller stirrer (propeller with four blades each having 10 cm diameter) was equipped so that the space between the blades and the inner bottom surface of the bath was 1.5 cm. Extraction was carried out at a propeller rotation rate of 600 r.p.m. for 15 minutes. The slurry obtained was treated according to the same manner as described in Example 1 to obtain an isolated soybean protein (T-3).

OD at 600 nm of a 10% aqueous solution of T-3 was 0.88. Its protein permeability through a membrane filter having a pore size of 0.22 micron was 75%.

EXAMPLE 4

Stirring conditions

According to the same manner as described in Example 1, an isolated soybean protein was prepared except that the soybean flakes having a high NSI (5 mm cube, NSI 90) was used and that the propeller rotation rate was varied as 150, 300 or 500 r.p.m.

A 10% aqueous solutions of each of the isolated soybean proteins was prepared and its transparency was measured by means of OD at 600 nm.

The relationship between the transparency and the rotation rate is shown in FIG. 1. As seen from FIG. 1 and the following Table 2, the transparency of the solution is influenced by the propeller rotation rate i.e. the degree of stirring during the extraction. When the rotation rate is 300 r.p.m. or higher, shear stress to the flakes becomes strong and association of the protein component in the soybean milk is accelerated. Then, the transparency of an aqueous solution of the resultant isolated soybean protein tends to be deteriorated remarkably. On the other hand, when the rotation rate is less than 300 rpm, the flakes receive less shear stress and association of the protein component scarcely occurs. Thus, the resultant isolated soybean protein can have excellent transparency.

Table 2 shows the protein permeability (%) through a 0.22 micron membrane filter of the soybean milk prepared at each rotation rate of propeller.

TABLE 2

| Rotation rate of propeller (r.p.m.) | Protein Permeability through 0.22 micron membrane |
|---|---|
| 150 | 95 |
| 300 | 87 |
| 500 | 78 |

Comparative Example 3

By using T-1 obtained in Example 1, C-2 obtained in Comparative Example 2, a commercially available isolated soybean protein from a company A ("Fujipro-R" manufactured by Fuji Oil Co., Ltd.) (Isolated Soybean Protein (A)) and a commercially available isolated soybean protein from a company B ("Ajipron SU2" manufactured by Ajinomoto Co., Ltd.) (Isolated Soybean Protein (B)) as samples, transparencies of aqueous solutions containing respective samples at various concentrations were compared by measuring OD at 600 nm. In addition, viscosity of 10% aqueous solutions, protein permeability (%) of 0.5% solutions through a 0.22 micron membrane were measured.

The results are shown in FIG. 2 and the following Table 3. FIG. 2 shows the relation between OD at 600 nm and the protein concentration of each sample solution.

As seen from these results, in comparison with the other samples, T-1 has extremely excellent transparency and the viscosity thereof is very low. On the other hand, the formation of considerably large associated colloids are found in 0.5% solutions of the commercially available products.

TABLE 3

| | T-1 | C-1 | Isolated Soybean Protein (A) | (B) |
|---|---|---|---|---|
| Viscosity (cps) | 30 | 320 | 350 | 280 |
| Protein permeability (%) | 88 | 50 | 35 | 30 |

Comparative Example 4

7S, 11S proteins 7S and 11S proteins were prepared according to the method of Thanh et al. (J. Agric. Food. Chem., 1979). Namely, a defatted soybean was extracted with a Tris-HCl buffer solution (pH 7.8, containing mercaptoethanol) and the resultant extracted slurry was centrifuged at 10,000 r.p.m. to remove the insoluble fraction and to obtain soybean milk. The pH of the soybean milk was adjusted to 6.6. After dialysis, the soybean milk was centrifuged at 10,000 r.p.m. to separate the precipitate fraction (a crude 11S fraction) from the supernatant fraction (a crude 7S fraction).

The crude 7S fraction was isoelectrically precipitated, washed with water, neutralized and dried to obtain 7S protein.

The crude 11S fraction was washed with water and neutralized to obtain 11S protein.

Comparative Example 5

An isolated soybean protein from which a lipophilic protein Glym was removed was prepared according to the method of Samoto et al. (Abstracts of Nippon Nogei Kagakukai Taikai, 1994). Namely, 1.5 parts of water was added to a defatted soybean and the pH was adjusted to 7.5 with sodium hydroxide. Extraction was carried out for 3 hours to obtain a soybean milk. The soybean milk was adjusted to pH 4.5 by addition of 1M sodium sulfate and the soybean milk was centrifuged at 20,000 r.p.m. for 10 minutes to remove the insoluble fraction. The supernatant fraction was desalted and then subjected to isoelectrical precipitation to obtain an isolated soybean protein from which 90% or more Glym had been removed.

Experiment 2

Regarding powdery isolated soybean proteins prepared according to the same manner as described in Comparative Examples 4 and 5 and Example 1, the following properties were evaluated:

protein permeability of a 0.5% aqueous solution through a 0.22 micron membrane, transparency (OD at 600 nm) and viscosity of a 10% aqueous solution, gel break strength of a gel prepared according to the same manner as described in Example 1, protein purity, 7S/11S ratio, and presence of 34 kd band on SDS-PAGE electrophoresis.

The results are shown in Table 4. As seen from Table 4, the solution of the isolated soybean protein of Example 1 is a colloidal solution in which association of protein components is prevented to a large extent. The viscosity of the solution is very low and the transparency of the solution is excellent. In addition, the 7S/11S ratio thereof is similar to that of a conventional commercially available isolated soybean protein. Thus, the properties thereof is quite different from those of the isolated soybean protein from which the lipophilic protein Glym (34 kd) has been removed. Therefore, the isolated soybean protein of Example 1 is a novel isolated soybean protein.

TABLE 4

| Preparation process | Ex. 1 | Comp. Ex. 5 | 7S of Comp. Ex. 4 | 11S of Comp. Ex. 4 |
|---|---|---|---|---|
| Protein permeability (%) | 88 | 43 | 45 | 50 |
| OD at 600 nm | 0.75 | 0.70 | 1.30 | 1.56 |
| Viscosity (cps) | 35 | 820 | 450 | 280 |
| Gel break strength (g) | 740 | 720 | 500 | 700 |
| Protein purity (%) | 95 | 95 | 91 | 95 |
| 7S/11S ratio | 1.05 | 1.16 | 4.88 | 0.09 |
| Presence of 34 kd | yes | no | no | yes |

Application Example 1

According to a conventional manner, a beverage supplemented with proteins (protein drink) of the formulation as shown in Table 5 was prepared by using either the powdery isolated soybean protein (T-1) prepared in Example 1 or a commercially available isolated soybean protein ("Fujipro-R" manufactured by Fuji Oil Co., Ltd.). Organoleptical evaluation was carried out by 10 panelists.

The results are shown in Table 6 by the number of the panelists among the 10 panelists who indicate the described evaluation.

TABLE 5

| Ingredients | Amounts |
|---|---|
| Powdery isolated soybean protein | 5 g |
| Sucrose | 2 g |
| Glucose fructose syrup | 3 g |
| Vitamin $B_1$ | 43 mg |
| Vitamin $B_2$ | 1.4 mg |
| Vitamin $B_6$ | 1.4 mg |
| Nicotinic acid | 8 mg |

TABLE 5-continued

| Ingredients | Amounts |
| --- | --- |
| Pantothenic acid | 3 mg |
| Vitamin C | 130 mg |
| Grapefruit flavor | 0.1 g |
| Water | up to 100 g |

TABLE 6

| T-1 | Commercially available isolated soybean protein |
| --- | --- |
| Taste | |
| good 9 | good 2 |
| average 1 | average 2 |
| bad 0 | bad 6 |
| Impression | smell of soybean, bitter, astringent |
| fresh aftertaste | |
| Image as a drink | |
| good 5 | good 0 |
| average 4 | average 3 |
| bad 1 | bad 7 |
| fresh feeling because of transparency | muddy feeling, not good |
| Impression | |
| no feeling of soybean milk no image of soybean | not good taste |

As seen from the results of Table 6, it has been found that the isolated soybean protein obtained in Example has superior taste to that of a conventional commercially available isolated soybean protein and provides a beverage which can be differentiated from this type of a conventional beverage with favorable image because of transparency. Therefore, a new type of beverage can be produced by using the isolated soybean protein of the present invention.

Application Example 2

A pickling solution for hams having the formulation as shown in Table 7 was prepared by using either the powdery isolated soybean protein (T-1) obtained in Example 1 or the commercially available conventional isolated soybean protein ("Fujipro-D" manufactured by Fuji Oil Co., Ltd.).

TABLE 7

| Ingredients | Amounts |
| --- | --- |
| Water | 80.4 |
| Isolated soybean protein | 6.0 |
| Lactalbumin | 3.0 |
| Dried egg white | 2.0 |
| Sodium caseinate | 1.0 |
| Salt | 3.4 |
| Sodium nitrite | 0.05 |
| Sodium tripolyphosphate | 0.4 |
| Sodium pyrophosphate | 0.4 |
| Sucrose | 2.0 |
| Seasoning, colorant | 0.4 |

Then, 80 parts of the pickle solution thus prepared using either T-1 or the commercially available conventional isolated soybean protein was injected to 100 parts of meat to be used as a raw material. The meat was subjected to vacuum-massage for 10 hours and then refrigerated for 15 hours.

Then, each pickled meat thus obtained was heated at 65° C. for 15 minutes to dry the meat and then smoked at 70° C. for 30 minutes. Further, the meat was cooked at 75° C. for 120 minutes so that the temperature of the center part of the meat became about 72° C. to obtain ham.

The cross section, mouthfeel and taste of the ham thus obtained was evaluated organoleptically. As a result, the ham prepared by using T-1 was superior to that prepared by using the commercially available isolated soybean protein because the former ham had less dull appearance on the cross section than the latter ham and had natural meat color without any artificial cloudiness.

On the cross section of the ham prepared by using the commercially available isolated soybean protein, unevenness and insufficient dispersion of the pickling solution were observed. On the other hand, in the ham prepared by using T-1, the pickling solution was uniformly and sufficiently dispersed and no unevenness was observed.

The ham prepared by using T-1 had flexible and pleasant mouthfeel in addition to excellent taste, while the ham prepared by using the commercially available isolated soybean protein had elastic mouthfeel.

Application Example 3

According to the formulation as shown in Table 8, hamburgers were prepared by using the soybean protein material obtained in Example 1, a commercially available defatted okara "Proplus 1500" and a commercially available conventional condensed soybean protein "Solpy 600", respectively, and they were tested for prevention of dripping, mouthfeel and taste. In order to evaluate the effect of the soybean protein materials strictly, vegetables, seasonings and flavors were not included in the formulation of the hamburger.

TABLE 8

| Ingredients | Amount (parts) |
| --- | --- |
| Pork meat (shoulder) | 80 |
| Salt | 1 |
| Water | 7 |
| Soybean protein material to be tested | 4 |
| Cold Water | 8 |
| Total | 100 |

The hamburger was prepared by adding the soybean protein material to be tested to the meat, mixing them with a food cutter for 2 minutes, adding salt and cold water thereto, mixing them for 1 minute, adding water thereto and mixing them additional for 1 minute to obtain a raw hamburger. After deaeration in a vacuum deaerater, the raw hamburger was filled into a casing having the lay flat width of 35 mm and heated in a water bath at 80° C. for 30 minutes (1st heating). The heated material was frozen at −20° C. overnight and then heated at 100° C. for 10 minutes by boiling (2nd heating). After cooling, tastes and mouthfeel of the hamburgers thus prepared were organoleptically evaluated. The prevention of dripping was determined from the weight change between before the 1st heating and after the 2nd heating.

The results are shown in Tables 9 and 10.

TABLE 9

|  | Control | Soybean protein material | Defatted okara |
|---|---|---|---|
| Yield by the 1st heating | 64.7% | 76.9 | 75.8 |
| Yield by the 2nd heating | 89.5 | 98.4 | 97.6 |
| Taste |  | taste of meat slight smell of soybean | smell of grain weak taste of meat |
| Mouthfeel | hard and fragile | soft and juicy no sticky feeling smooth to the throat | soft and juicy sticky in mouth rough to the throat |

TABLE 10

|  | Concentrated soybean protein |
|---|---|
| Yield by the 1st heating | 74.6% |
| Yield by the 2nd heating | 95.2% |
| Taste | smell of drugs weak taste of meat |
| Mouthfeel | juicy somewhat sticky somewhat powdery somewhat rough to the throat |

The soybean protein material of Example 1 had better integrity and, in comparison with other soybean materials, showed better prevention of dripping (i.e., oil retention). As for the taste, the hamburger prepared by using the soybean protein material of Example 1 had good meat taste with little foul taste of soybean. Thus, the taste of the soybean protein material of Example 1 was excellent. In addition, there were no sticky and powdery mouthfeel and the feeling to the throat was excellent.

As described hereinabove, according to the present invention, a novel isolated soybean protein having properties that it can form transparent solution and gel which cannot be obtained by a conventional isolated soybean protein. In addition, its taste is superior to a conventional product.

Regarding the process for producing the isolated soybean protein of the present invention, it is simple because the process does not require a complicated operation such as fractionation of 7S and 11S proteins and addition of agents such as a protein solubilizing agent and an alkaline agent.

Thus, the present invention can provide the isolated soybean protein which is safe as a food material, has excellent physical properties (transparency, gel formation ability and the like) and can be used widely.

Moreover, the present invention can provide a soybean protein material having a novel composition. That is, the soybean protein material of the present invention has the certain protein content and thereby it has an excellent taste and mouthfeel in addition to its excellent water retention and oil retention, minimized mouthfeel change due to freeze-thaw treatment.

What is claimed is:

1. A defatted soybean milk comprising soybean proteins at least 85% of which can permeate a membrane filter having a pore size of 0.22 micron, and on optical density at 600 nm of an aqueous solution of said defatted soybean milk containing 2.2% by weight of soybean proteins being at most 1.2.

2. A soybean protein material which comprises 40 to 65% by weight of soybean proteins, 20 to 50 by weight of soybean fiber and at most 5% by weight of soybean soluble saccharides based on the dry solids content of the soybean protein material, said material having an nitrogen salt solubility index of at least 20.

3. An isolated soybean protein having a permeability in its aqueous solution or dispersion state such that at least 65% of said soybean protein can permeate a membrane filter having a pore size of 0.22 micron, an optical density at 600 nm of an aqueous solution of 10% by weight of said soybean protein being at most 2 and a viscosity of an aqueous solution containing 10% by weight of said soybean protein being at most 400 cps.

4. A process for producing a soybean protein material and an isolated soybean protein which comprises the steps of:

extracting defatted soybean milk from a defatted soybean raw material in an aqueous slurry of a defatted soybean by stirring the slurry at a rotation rate of not higher than 650 r.p.m., while maintaining soybean protein molecules in such a state that at least about 85% of soybean proteins in the defatted soybean milk can permeate a membrane filter having a pore size of 0.22 micron to prevent association of soybean proteins in the slurry, separating the defatted soybean milk from the slurry to obtain an extraction residue as the soybean protein material, said defatted soybean milk comprising soybean proteins at least 85% of which can permeate a membrane filter having a pore size of 0.22 micron, and an optical density at 600 nm of an aqueous solution of said defatted soybean milk containing 2.2% by weight of soybean proteins being at most 1.2, and said soybean protein material comprising 40 to 65% by weight of soybean proteins, 20 to 50% by weight of soybean fiber and at most 5% by weight of soybean soluble saccharides based on the dry solids content of the soybean protein material, said material having a nitrogen salt solubility index of at least 20, and isolating a soybean protein from the defatted soybean milk to obtain the isolated soybean protein having such a permeability in its aqueous solution or dispersion state that at least 65% of soybean proteins can permeate a membrane filter having a pore size of 0.22 micron, an optical density at 600 nm of an aqueous solution of 10% by weight of said soybean protein being at most 2 and a viscosity of an aqueous solution containing 10% by weight of said soybean protein being at most 400 cps, said defatted soybean milk being kept at 40°C. or lower until isolation of said soybean protein.

* * * * *